US012741446B2

(12) United States Patent
Zaizen et al.

(10) Patent No.: US 12,741,446 B2
(45) Date of Patent: Sep. 22, 2026

(54) NON-ORIENTED ELECTRICAL STEEL SHEET

(71) Applicant: JFE STEEL CORPORATION, Tokyo (JP)

(72) Inventors: Yoshiaki Zaizen, Tokyo (JP); Yukino Miyamoto, Tokyo (JP); Yoshihiko Oda, Tokyo (JP); Tomoyuki Okubo, Tokyo (JP); Souichiro Yoshizaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 112 days.

(21) Appl. No.: 18/724,296

(22) PCT Filed: Dec. 14, 2022

(86) PCT No.: PCT/JP2022/046098
§ 371 (c)(1),
(2) Date: Jun. 26, 2024

(87) PCT Pub. No.: WO2023/132198
PCT Pub. Date: Jul. 13, 2023

(65) Prior Publication Data
US 2025/0196471 A1 Jun. 19, 2025

(30) Foreign Application Priority Data
Jan. 7, 2022 (JP) ................................ 2022-001880

(51) Int. Cl.
*B32B 15/01* (2006.01)
*C22C 38/00* (2006.01)
(Continued)

(52) U.S. Cl.
CPC .......... *B32B 15/011* (2013.01); *C22C 38/002* (2013.01); *C22C 38/004* (2013.01);
(Continued)

(58) Field of Classification Search
None
See application file for complete search history.

(56) References Cited

U.S. PATENT DOCUMENTS

2020/0190639 A1* 6/2020 Nakajima ............... C22C 38/04
2021/0134500 A1* 5/2021 Oda ...................... C22C 38/008
(Continued)

FOREIGN PATENT DOCUMENTS

EP 3725906 A1 10/2020
JP H11293422 A 10/1999
(Continued)

OTHER PUBLICATIONS

Feb. 28, 2023, International Search Report issued in the International Patent Application No. PCT/JP2022/046098.
(Continued)

*Primary Examiner* — Xiaobei Wang
(74) *Attorney, Agent, or Firm* — KENJA IP LAW PC

(57) ABSTRACT

Low iron loss and high magnetic flux density in a Si-gradient magnetic material are achieved. A non-oriented electrical steel sheet is a multilayer electrical steel sheet comprising of an inner layer and a surface layer located on each of both sides of the inner layer, wherein the surface layer and the inner layer have predetermined chemical compositions, ΔSi defined as a difference in Si content between the surface layer and the inner layer is 0.1 mass % to 0.5 mass %, a ratio $t_1/t$ of a total thickness $t_1$ of both surface layers to a sheet thickness t is 0.04 to 0.78, a ratio $B_{50}/Bs$ is 0.825 or more, and iron loss $W_{10/800}$ and the sheet thickness t satisfy $W_{10/800} \leq 13+80 \times t$.

2 Claims, 2 Drawing Sheets

(51) Int. Cl.

| | |
|---|---|
| ***C22C 38/02*** | (2006.01) |
| ***C22C 38/10*** | (2006.01) |

(52) U.S. Cl.

CPC ............ *C22C 38/008* (2013.01); *C22C 38/02* (2013.01); *C22C 38/10* (2013.01); *B32B 2250/02* (2013.01); *B32B 2307/208* (2013.01); *B32B 2307/7376* (2023.05); *B32B 2311/30* (2013.01)

(56) References Cited

U.S. PATENT DOCUMENTS

| | | | | |
|---|---|---|---|---|
| 2021/0151229 | A1 | 5/2021 | Oda et al. | |
| 2022/0278566 | A1* | 9/2022 | Zaizen | C22C 38/004 |
| 2022/0290287 | A1 | 9/2022 | Miyamoto et al. | |
| 2023/0025678 | A1 | 1/2023 | Don et al. | |

FOREIGN PATENT DOCUMENTS

| | | | | |
|---|---|---|---|---|
| JP | 2010132938 A | | 6/2010 | |
| JP | 2014196539 A | | 10/2014 | |
| JP | 2020190026 A | | 11/2020 | |
| KR | 1020210080726 A | | 7/2021 | |
| WO | 2019117095 A1 | | 6/2019 | |
| WO | WO-2020262063 A1 | * | 12/2020 | H01F 1/14783 |
| WO | 2021065555 A1 | | 4/2021 | |
| WO | WO-2023282195 A1 | * | 1/2023 | C21D 9/46 |

OTHER PUBLICATIONS

Jun. 5, 2025, the Extended European Search Report issued by the European Patent Office in the corresponding European Patent Application No. 22918784.4.

Manfred Kodym et al., Spurenelemente im Stahl—Möglichkeiten zur Beeinflussung im Schmelzbetrieb, Spurenelemente in Staehlen, Jan. 1, 1985, pp. 19-22.

* cited by examiner

NON-ORIENTED ELECTRICAL STEEL SHEET

TECHNICAL FIELD

The present disclosure relates to a non-oriented electrical steel sheet, particularly a non-oriented electrical steel sheet having a Si concentration gradient in the thickness direction.

BACKGROUND

For example, motors for drones and fan motors for servers are increasingly driven in a high frequency range of 400 Hz to 1 kHz from the viewpoint of size reduction, weight reduction, and efficiency enhancement. Non-oriented electrical steel sheets used as a core material of such motors are required to have low high-frequency iron loss and high magnetic flux density.

An effective way of reducing high-frequency iron loss is to increase specific resistance, and accordingly high Si steels are conventionally developed. However, since Si is a non-magnetic element, there is a problem in that magnetic flux density and saturation magnetization decrease.

As a method of achieving both reduced high-frequency iron loss and high magnetic flux density, a Si-gradient magnetic material whose Si concentration gradient in the thickness direction is controlled is developed. For example, JP H11-293422 A (PTL 1) discloses an electrical steel sheet that has a Si concentration gradient in the thickness direction, wherein the Si concentration at the surface of the steel sheet is higher than the Si concentration at the center of the sheet thickness of the steel sheet, a part having a Si concentration of 5% to 8% occupies 10% or more of the sheet thickness from both surfaces of the steel sheet in the thickness direction, and the Si concentration at the center of the sheet thickness of the steel sheet is 3.4% or more.

CITATION LIST

Patent Literature

PTL 1: JP H11-293422 A

SUMMARY

Technical Problem

However, when a material merely having a Si concentration gradient in the thickness direction is used as an iron core material for motors of drones, vacuum cleaners, etc. (for example, frequency: 400 Hz to 1 kHz, magnetic flux density: 0.8 T to 2.0 T), hysteresis loss is high and magnetic flux density is low, so that iron loss and copper loss cannot be reduced sufficiently. It could therefore be helpful to achieve low iron loss and high magnetic flux density in a Si-gradient magnetic material.

Solution to Problem

In order to achieve both low iron loss and high magnetic flux density, we repeatedly studied the influences of components on the magnetic properties of a Si-gradient material. We consequently discovered that both low high-frequency iron loss and high magnetic flux density can be achieved by optimizing the difference in Si concentration between the surface layer and the inner layer of the Si-gradient material and further adding Co and one or two selected from Sn and Sb.

We provide the following.

1. A non-oriented electrical steel sheet that is a multilayer electrical steel sheet having a stacked structure of an inner layer and a surface layer located on each of both sides of the inner layer, wherein the surface layer has a chemical composition containing (consisting of), in mass %, Si: 4.0% to 7.0%, C: 0.0010% to 0.0100%, Co: 0.0010% to 0.0100%, and one or two selected from Sn: 0.010% to 0.100% and Sb: 0.010% to 0.100%, with a balance consisting of Fe and inevitable impurities, the inner layer has a chemical composition containing (consisting of), in mass %, Si: 3.5% to 6.5%, C: 0.0010% to 0.0100%, Co: 0.0010% to 0.0100%, and one or two selected from Sn: 0.010% to 0.100% and Sb: 0.010% to 0.100%, with a balance consisting of Fe and inevitable impurities, ΔSi defined as a difference $[Si]_1-[Si]_0$ between a Si content $[Si]_1$ in the surface layer and a Si content $[Si]_0$ in the inner layer is 0.1 mass % to 0.5 mass %, a ratio $t_1/t$ of a total thickness $t_1$ of the surface layers on both sides of the inner layer to a sheet thickness t of the electrical steel sheet is 0.04 to 0.78, and a ratio $B_{50}/Bs$ of magnetic flux density $B_{50}$ at a magnetic field strength of 5000 A/m to saturation magnetization Bs is 0.825 or more, and iron loss $W_{10/800}$ at a frequency of 800 Hz and a maximum magnetic flux density of 1.0 T and the sheet thickness t satisfy the following formula (1):

$$W_{10/800} \leq 13 + 80 \times t. \quad (1)$$

2. The non-oriented electrical steel sheet according to 1., wherein one or both of the chemical composition of the surface layer and the chemical composition of the inner layer further contain, in mass %, P: 0.100% or less.

3. The non-oriented electrical steel sheet according to 1, or 2., wherein one or both of the chemical composition of the surface layer and the chemical composition of the inner layer further contain, in mass %, one or two selected from Ge and Ga: 0.0100% or less in total.

4. The non-oriented electrical steel sheet according to any of 1. to 3., wherein one or both of the chemical composition of the surface layer and the chemical composition of the inner layer further contain, in mass %, one or more selected from Cu, Cr, and Ni: 1.00% or less in total.

5. The non-oriented electrical steel sheet according to any of 1. to 4., wherein one or both of the chemical composition of the surface layer and the chemical composition of the inner layer further contain, in mass %, one or more selected from Ca, Mg, and REM: 0.0200% or less in total.

6. The non-oriented electrical steel sheet according to any of 1. to 5., wherein one or both of the chemical composition of the surface layer and the chemical composition of the inner layer further contain, in mass %, Zn: 0.0500% or less.

7. The non-oriented electrical steel sheet according to any of 1. to 6., wherein one or both of the chemical composition of the surface layer and the chemical composition of the inner layer further contain, in mass %, one or two selected from Mo and W: 0.0500% or less in total.

8. The non-oriented electrical steel sheet according to any of 1. to 7., wherein a maximum intensity value of {100} plane integration degree is 6.0 or more in a $\Phi_2$=45° section of an orientation distribution function at a plane of a depth of ¼ of the sheet thickness from a surface of the multilayer electrical steel sheet.

9. The non-oriented electrical steel sheet according to any of 1. to 8., wherein the sheet thickness is 0.03 mm to 0.20 mm.

Advantageous Effect

It is thus possible to provide a Si-gradient magnetic material having low iron loss and high magnetic flux density.

DETAILED DESCRIPTION

We conducted various experiments that led to the presently disclosed techniques. Examples of these experiments will be described below. For a non-oriented electrical steel sheet that is a multilayer electrical steel sheet in which the Si content differs between the inner layer and each of the surface layers sandwiching the inner layer from both sides, how the difference ΔSi in Si content between the surface layer and the inner layer (hereafter also simply referred to as "ΔSi") influences the magnetic properties was studied. In detail, multilayer electrical steel sheets with different ΔSi were produced according to the following procedure, and their magnetic properties were evaluated. In the following description, "%" denotes "mass %" unless otherwise specified.

First, a steel material for the surface layer was bonded or joined to both sides of a steel material for the inner layer so that the ratio of the thickness of each surface layer to the sheet thickness (entire thickness) of the electrical steel sheet would be 0.3 (i.e. the ratio of the total thickness of both surface layers to the entire sheet thickness would be 0.6), and then hot rolling was performed. As the steel material for the surface layer and the steel material for the inner layer, ingots prepared by steelmaking so as to have desired chemical compositions were used. The Si content $[Si]_0$ in the inner layer was 4.0%. A plurality of steel materials for the surface layer different in Si content were prepared so as to vary the Si content $[Si]_1$ in the surface layer in the range of 4.0% to 7.0%. The chemical compositions of both the surface layer and the inner layer contained C: 0.0025%, Co: 0.0030%, and Sn: 0.030%, with the balance consisting of Fe and inevitable impurities. The surface layers on both sides of the inner layer had the same chemical composition.

After the hot rolling, hot-rolled sheet annealing was performed at 1000° C. for 30 seconds, and then cold rolling was performed to a sheet thickness of 0.10 mm. After this, final annealing was performed at 1080° C. for 30 seconds to obtain an electrical steel sheet.

Test pieces of 30 mm in width and 180 mm in length were collected from each of the obtained electrical steel sheets, and an Epstein test was conducted to evaluate the magnetic properties. In the Epstein test, measurements were made using L-direction test pieces collected so that the length direction of the test pieces would be the rolling direction (L direction) and C-direction test pieces collected so that the length direction of the test pieces would be a direction (C direction) orthogonal to the rolling direction where the L-direction test pieces and the C-direction test pieces were equal in number, and the average value of the magnetic properties in the L-direction and the C-direction was used for evaluation.

Figure 1:
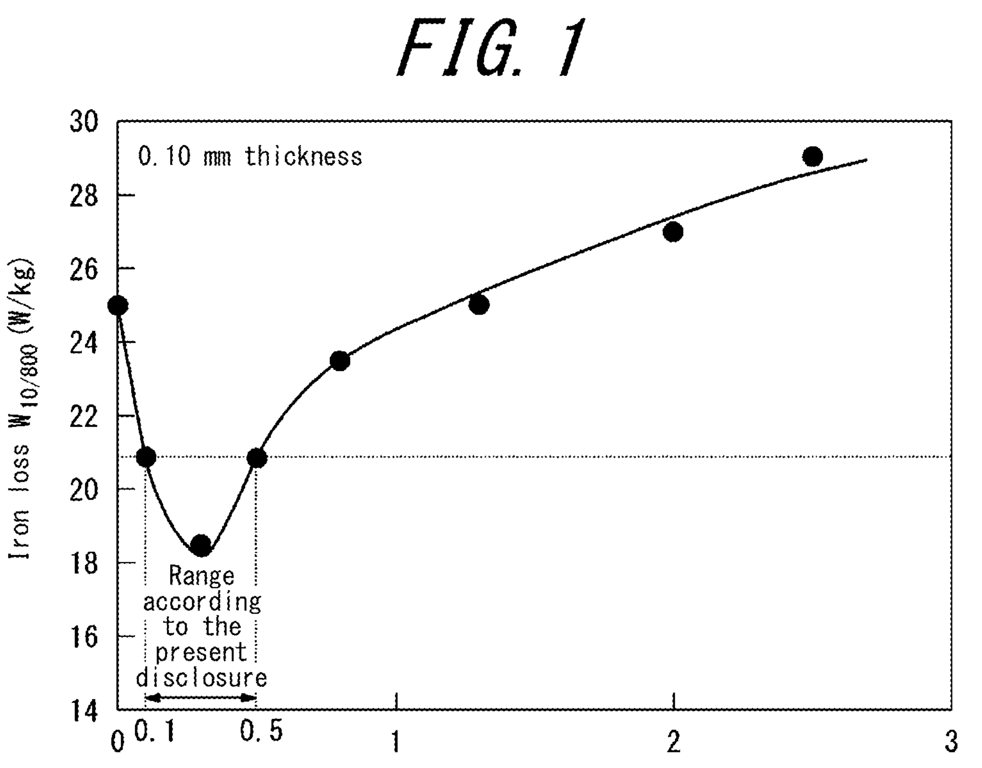
FIG. 1 is a graph illustrating the correlation between ΔSi (mass %) defined as the difference ($[Si]_1-[Si]_0$) in Si content between a surface layer and an inner layer and total iron loss $W_{10/800}$ (W/kg) at 1.0 T and 800 Hz.
Figure 2:
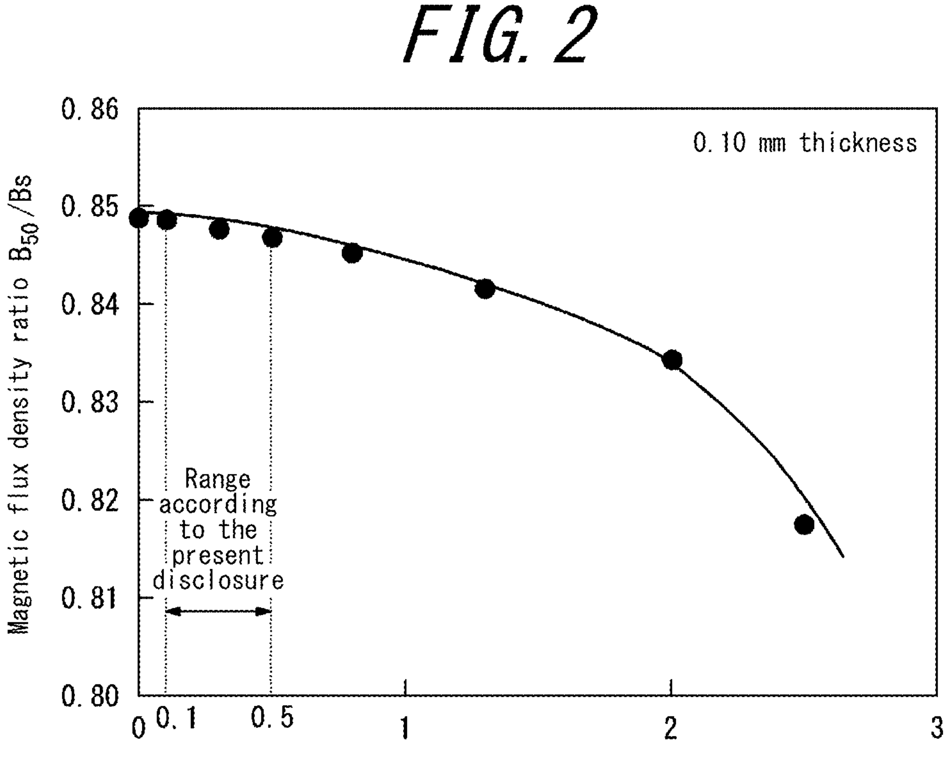
FIG. 2 is a graph illustrating the correlation between ΔSi and the magnetic flux density ratio ($B_{50}/Bs$)

FIG. 1 illustrates the correlation between ΔSi (mass %) defined as the difference ($[Si]_1-[Si]_0$) in Si content between the surface layer and the inner layer and total iron loss $W_{10/800}$ (W/kg) at 1.0 T and 800 Hz. FIG. 2 illustrates the correlation between ΔSi and the magnetic flux density ratio ($B_{50}/Bs$). As used herein, the term "magnetic flux density ratio" means the ratio ($B_{50}/Bs$) of magnetic flux density $B_{50}$ at a magnetic field strength of 5000 A/m to saturation magnetization Bs.

As can be seen from the results illustrated in FIG. 1, the iron loss is low when ΔSi is 0.1 mass % or more and 0.5 mass % or less. Specifically, in the case where the sheet thickness t=0.10 mm, the iron loss $W_{10/800}$ can be reduced to 21.0 W/kg or less, which results from substituting the sheet thickness t=0.10 mm to the following formula (1):

$$W_{10/800} \leq 13 + 80 \times t. \quad (1)$$

Moreover, as can be seen from the results illustrated in FIG. 2, the magnetic flux density ratio decreases sharply when ΔSi is more than 0.5 mass %. The reason for this is considered to be as follows: When the Si content is higher in the surface layer than in the inner layer, the surface layer has higher magnetic permeability than the inner layer. Consequently, magnetic flux concentrates in the surface layer, and eddy current loss decreases. However, if ΔSi is excessively large, the difference in lattice constant and the difference in magnetostriction between the surface layer and the inner layer increase accordingly. As a result, the stress applied when the steel sheet is magnetized increases, so that hysteresis loss increases and the magnetic flux density in the medium magnetic field region decreases.

For the above reason, in the present disclosure, ΔSi defined as the difference ($[Si]_1-[Si]_0$) between the Si content in the surface layer and the Si content in the inner layer is 0.1 mass % to 0.5 mass %. ΔSi is preferably 0.2 mass % to 0.4 mass %.

Next, how the ratio ($t_1/t$) of the total thickness $t_1$ of the surface layers to the sheet thickness t of the multilayer electrical steel sheet (hereafter also referred to as "multilayer ratio") influences the magnetic properties was studied. In detail, electrical steel sheets with different multilayer ratios were produced according to the following procedure, and their magnetic properties were evaluated. As used herein, the "total thickness of the surface layers" means the sum of the thicknesses of the surface layers provided on both sides of the inner layer.

First, a steel material for the surface layer and a steel material for the inner layer were bonded or joined together so that the multilayer ratio would be 0.02 to 0.80, and hot rolling was performed. As the steel material for the surface layer and the steel material for the inner layer, ingots prepared by steelmaking so as to have desired chemical compositions were used. The Si content $[Si]_1$ in the surface layer was 6.3%, and the Si content $[Si]_0$ in the inner layer was 6.0%. The chemical compositions of both the surface layer and the inner layer contained C: 0.0030%, Co: 0.0015%, and Sn: 0.050%, with the balance consisting of Fe and inevitable impurities. The surface layers on both sides of the inner layer had the same chemical composition.

After the hot rolling, hot-rolled sheet annealing was performed at 980° C. for 30 seconds, and then cold rolling was performed to a sheet thickness of 0.08 mm. After this, final annealing was performed at 1100° C. for 30 seconds to obtain an electrical steel sheet.

Figure 3:
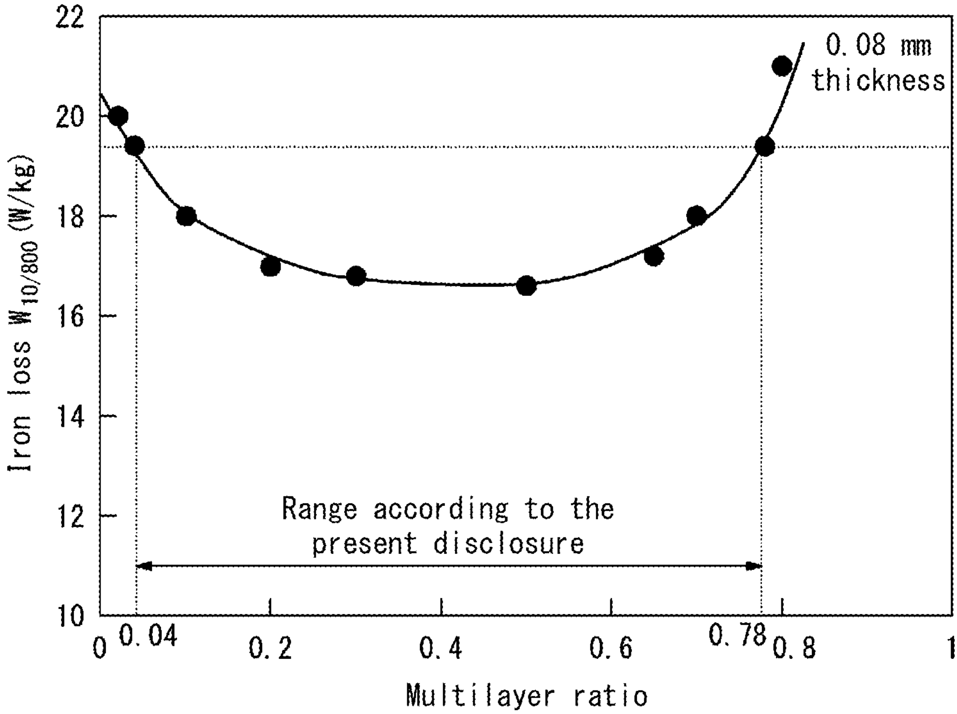
FIG. 3 is a graph illustrating the correlation between the multilayer ratio and the total iron loss ($W_{10/800}$).

FIG. 3 illustrates the correlation between the multilayer ratio and the total iron loss ($W_{10/800}$). As can be seen from the results illustrated in FIG. 3, the iron loss decreases significantly when the multilayer ratio is 0.04 to 0.78. Specifically, in the case where the sheet thickness t=0.08 mm, the iron loss $W_{10/800}$ can be reduced to 19.4 W/kg or less, which results from substituting the sheet thickness t=0.08 mm to the following formula (1):

$$W_{10/800} \leq 13 + 80 \times t. \tag{1}$$

The reason for such decrease in iron loss is considered to be as follows: If the multilayer ratio is less than 0.04, the proportion of the surface layer high in resistance is low, so that eddy current which concentrates in the surface layer cannot be reduced effectively. If the multilayer ratio is more than 0.78, the difference in magnetic permeability between the surface layer and the inner layer is small, so that magnetic flux penetrates into the inner layer and eddy current loss also occurs from the inner layer. Hence, limiting the multilayer ratio to 0.04 to 0.78 can reduce iron loss. For the above reason, in the present disclosure, the multilayer ratio ($t_1/t$) is 0.04 to 0.78. $t_1/t$ is preferably 0.10 to 0.70, and more preferably 0.30 to 0.60.

The thickness $t_{1-1}$ of the surface layer on one side of the inner layer and the thickness $t_{1-2}$ of the surface layer on the other side of the inner layer are preferably the same, but do not necessarily need to be the same. In detail, $t_{1-1}$ and $t_{1-2}$ may differ by about 20% or less (i.e. when the thicker one of $t_{1-1}$ and $t_{1-2}$ is 100%, the thinner one of $t_{1-1}$ and $t_{1-2}$ is 80% to 100%).

[Sheet Thickness]

The sheet thickness t of the multilayer electrical steel sheet is not limited and may be any value. However, if the multilayer electrical steel sheet is excessively thin, cold rolling and annealing in the production of the multilayer electrical steel sheet are difficult, which may lead to an increase in cost. Therefore, from the viewpoint of reducing production costs, t is preferably 0.03 mm or more. If t is 0.20 mm or less, eddy current loss can be further reduced, and as a result the total iron loss can be further reduced. Therefore, t is preferably 0.20 mm or less.

[Magnetic Flux Density Ratio]

$B_{50}$/Bs: 0.825 or More

The ratio ($B_{50}$/Bs) of magnetic flux density $B_{50}$ at a magnetic field strength of 5000 A/m to saturation magnetization Bs is 0.825 or more. As a result of $B_{50}$/Bs being high (0.825 or more), the rise of the magnetization curve in the design magnetic flux density region used in small motors can be improved. This reduces the motor current required to obtain certain torque, with it being possible to reduce copper loss and improve motor efficiency.

[Iron Loss]

In the present disclosure, the iron loss (total iron loss) $W_{10/800}$ (W/kg) at a frequency of 800 Hz and a maximum magnetic flux density of 1.0 T and the sheet thickness t (mm) need to satisfy the following formula (1):

$$W_{10/800} \leq 13 + 80 \times t. \tag{1}$$

If the formula (1) is not satisfied, not only motor efficiency decreases, but also the heat generated in the stator core exceeds 100° C. and a cooling system is required. Since the iron loss depends on the sheet thickness, the upper limit of the iron loss in the formula (1) is defined based on the influence of the sheet thickness.

In order to satisfy the formula (1), hysteresis loss is reduced by texture control, and eddy current loss is reduced by controlling each of the Si concentration gradient and the multilayer ratio within a predetermined range.

[Texture]

Maximum Intensity Value of {100} Plane Integration Degree: 6.0 or More

By adding an appropriate amount of Co and adding an appropriate amount of at least one of Sn and Sb, which are segregation elements, it is possible to increase {100} plane in the non-oriented electrical steel sheet and ease magnetization within the plane. Moreover, adding an appropriate amount of P, which is a segregation element, too, enhances the effect of increasing {100} plane. As a result, magnetic flux density is improved and hysteresis loss is reduced. Therefore, the {100} plane integration degree is preferably 6.0 or more. The {100} plane integration degree is defined herein as the intensity in a $\Phi_2$=45° section of the orientation distribution function (ODF) at a plane of a depth of ¼ of the sheet thickness from the surface of the non-oriented electrical steel sheet.

The reasons for limiting the components in the present disclosure will be explained below.

[Chemical Composition]

The chemical compositions of the surface layer and the inner layer will be described below. In the following description, "%" representing the content of each element denotes "mass %" unless otherwise specified.

[Chemical Composition of Surface Layer]

First, the chemical composition of the surface layer will be described. In the present disclosure, both a first surface layer provided on one side of the multilayer electrical steel sheet and a second surface layer provided on the other side of the multilayer electrical steel sheet have the below-described chemical composition. The chemical composition of the first surface layer and the chemical composition of the second surface layer are typically the same, but may be different. Herein, the content of each element in the surface layer refers to the average content of the element in each surface layer.

The chemical composition of the surface layer contains Si: 4.0% to 7.0%, C: 0.0010% to 0.0100%, Co: 0.0010% to 0.0100%, and one or two selected from Sn: 0.010% to 0.100% and Sb: 0.010% to 0.100%, with the balance consisting of Fe and inevitable impurities.

Si: 4.0% to 7.0%

Si is an element that has the effect of increasing the electric resistance of the steel sheet and reducing eddy current loss. If the Si content ($[Si]_1$) in the surface layer is less than 4.0%, eddy current loss cannot be reduced effectively. The Si content in the surface layer is therefore 4.0% or more, and preferably 4.5% or more. If the Si content in the surface layer is more than 7.0%, saturation magnetization decreases and consequently magnetic flux density decreases. The Si content in the surface layer is therefore 7.0% or less, preferably less than 6.8%, and more preferably 6.5% or less. As mentioned above, the expression "the Si content in the surface layer is 4.0% to 7.0%" means that the average Si content in the first surface layer is 4.0% to 7.0% and the average Si content in the second surface layer is 4.0% to 7.0%. The average Si content in the first surface layer and the average Si content in the second surface layer may be the same or different. The same definition applies to the other elements described below.

C: 0.0010% to 0.0100%

C is an element that segregates to crystal grain boundaries to enhance grain boundary strength and improve material workability. If the C content is 0.0010% or more, material elongation is improved. The lower limit of the C content is therefore 0.0010%. The C content is preferably 0.0015% or more. If the C content is more than 0.0100%, iron loss increases due to magnetic aging. The upper limit of the C content is therefore 0.0100%. The C content is preferably 0.0060% or less.

Co: 0.0010% to 0.0100%

Adding Co can significantly improve the texture after final annealing, thus improving magnetic flux density and reducing hysteresis loss. In order to achieve this effect, in the case of adding Co, the Co content is 0.0010% or more. The Co content is preferably 0.0015% or more. If the Co content is more than 0.0100%, not only the effect is saturated but also costs increase. The Co content is therefore 0.0100% or less. The Co content is preferably 0.0050% or less.

One or two selected from Sn and Sb: 0.010% to 0.100%

Sn: 0.010% to 0.100%

Adding Sn can significantly improve the texture after final annealing, thus improving magnetic flux density and reducing hysteresis loss. In order to achieve this effect, in the case of adding Sn, the Sn content is 0.010% or more. The Sn content is preferably 0.020% or more. If the Sn content is more than 0.100%, not only the effect is saturated but also productivity decreases and costs increase. The Sn content is therefore 0.100% or less. The Sn content is preferably 0.080% or less.

Sb: 0.010% to 0.100%

Adding Sb can significantly improve the texture after final annealing, thus improving magnetic flux density and reducing hysteresis loss, as with Sn. In order to achieve this effect, in the case of adding Sb, the Sb content is 0.010% or more. The Sb content is preferably 0.020% or more. If the Sb content is more than 0.100%, not only the effect is saturated but also productivity decreases and costs increase. The Sb content is therefore 0.100% or less. The Sb content is preferably 0.080% or less.

Preferably, the chemical composition of the surface layer optionally further contains P: 0.100% or less.

P: 0.100% or Less

Adding P can significantly improve the texture, thus improving magnetic flux density and reducing hysteresis loss, as with Sn, Sb, and Co. In order to achieve this effect, in the case of adding P, the P content is preferably 0.010% or more. The P content is more preferably 0.030% or more. If the P content is more than 0.100%, not only the effect is saturated but also productivity decreases and costs increase. The P content is therefore preferably 0.100% or less. The P content is more preferably 0.070% or less.

The chemical composition of the surface layer may optionally contain one or more of the following elements.

One or Two Selected from Ge and Ga: 0.0100% or Less in Total

Ge and Ga have the effect of improving the texture. In order to achieve this effect, in the case of adding one or both of Ge and Ga, the total content of one or two selected from Ge and Ga is preferably 0.0005% or more. The total content is more preferably 0.0020% or more. If the total content of one or two selected from Ge and Ga is more than 0.0100%, the effect is saturated and alloy costs merely increase. Therefore, in the case of adding one or both of Ge and Ga, the total content is 0.0100% or less. The total content is more preferably 0.0050% or less.

One or More Selected from Cu, Cr, and Ni: 1.00% or Less in Total

Cu, Cr, and Ni increase specific resistance and are advantageous in reducing iron loss. In order to achieve this effect, in the case of adding at least one of Cu, Cr, and Ni, the total content of one or more selected from Cu, Cr, and Ni is preferably 0.03% or more. If the total content of one or more selected from Cu, Cr, and Ni is excessively high, magnetic flux density decreases. Therefore, in the case of adding at least one of Cu, Cr, and Ni, the total content is 1.00% or less.

One or More Selected from Ca, Mg, and REM: 0.0200% or Less in Total

Ca, Mg, and REM have the effect of forming stable sulfides and improving grain growth. In order to achieve this effect, the total content of one or more selected from Ca, Mg, and REM is preferably 0.0010% or more. If the total content of one or more selected from Ca, Mg, and REM is more than 0.0200%, the effect is saturated. Therefore, in the case of adding at least one of Ca, Mg, and REM, the total content is 0.0200% or less.

Zn: 0.0500% or Less

Zn has the effect of suppressing nitridation during final annealing. In order to achieve this effect, in the case of adding Zn, the Zn content is preferably 0.0010% or more. The Zn content is more preferably 0.0020% or more. If the Zn content is more than 0.0500%, sulfides are formed and iron loss increases. Therefore, in the case of adding Zn, the Zn content is 0.0500% or less. The Zn content is more preferably 0.0100% or less.

One or Two Selected from Mo and W: 0.0500% or Less in Total

Both Mo and W are elements effective in suppressing surface defects (scab) in non-oriented electrical steel sheets. The non-oriented electrical steel sheet according to the present disclosure is high-alloy steel and its surface is susceptible to oxidation, so that scab caused by surface cracking is highly likely to occur. Adding a small amount of one or both of Mo and W, which are elements that enhance high-temperature strength, can suppress such cracking. This effect cannot be achieved sufficiently if the total content of one or two selected from Mo and W is less than 0.0010%. Therefore, in the case of adding one or both of Mo and W, the total content is preferably 0.0010% or more. If the total content of one or two selected from Mo and W is more than 0.0500%, the effect is saturated and alloy costs merely increase. Therefore, in the case of adding one or both of Mo and W, the total content is 0.0500% or less.

In one embodiment of the present disclosure, the surface layer has a chemical composition that contains the above-described elements with the balance consisting of Fe and inevitable impurities.

An example of an element that can be contained in the electrical steel sheet as such inevitable impurities is Al. If the Al content is limited to 0.10% or less, magnetic flux density can be further improved. The Al content is therefore preferably 0.10% or less.

[Chemical Composition of Inner Layer]

Next, the chemical composition of the inner layer will be described. Herein, the content of each element in the inner layer refers to the average content of the element in the inner layer.

The chemical composition of the inner layer contains Si: 3.5% to 6.5%, C: 0.0010% to 0.0100%, Co: 0.0010% to 0.0100%, and one or two selected from Sn: 0.010% to 0.100% and Sb: 0.010% to 0.100%, with the balance consisting of Fe and inevitable impurities.

Si: 3.5% to 6.5%

If the Si content ($[Si]_0$) in the inner layer is less than 3.5%, high-frequency iron loss increases. The Si content in the inner layer is therefore 3.5 or more. The Si content in the inner layer is preferably 4.0% or more. If the Si content in the inner layer is more than 6.5%, the motor core cracks during blanking. The Si content in the inner layer is therefore 6.5% or less. The Si content in the inner layer is preferably 6.0% or less.

C: 0.0010% to 0.0100%

C is an element that segregates to crystal grain boundaries to enhance grain boundary strength and improve material workability. If the C content is 0.0010% or more, material elongation is improved. The lower limit of the C content is therefore 0.0010%. The C content is preferably 0.0015% or more. If the C content is more than 0.0100%, iron loss increases due to magnetic aging. The upper limit of the C content is therefore 0.0100%. The C content is preferably 0.0060% or less.

Co: 0.0010% to 0.0100%

Adding Co can significantly improve the texture after final annealing, thus improving magnetic flux density and reducing hysteresis loss. In order to achieve this effect, in the case of adding Co, the Co content is 0.0010% or more. The Co content is preferably 0.0015% or more. If the Co content is more than 0.0100%, not only the effect is saturated but also costs increase. The Co content is therefore 0.0100% or less. The Co content is preferably 0.0050% or less.

One or Two Selected from Sn and Sb: 0.010% to 0.100%

Sn: 0.010% to 0.100%

Adding Sn can significantly improve the texture after final annealing, thus improving magnetic flux density and reducing hysteresis loss. In order to achieve this effect, in the case of adding Sn, the Sn content is 0.010% or more. The Sn content is preferably 0.020% or more. If the Sn content is more than 0.100%, not only the effect is saturated but also productivity decreases and costs increase. The Sn content is therefore 0.100% or less. The Sn content is preferably 0.080% or less.

Sb: 0.010% to 0.100%

Adding Sb can significantly improve the texture after final annealing, thus improving magnetic flux density and reducing hysteresis loss, as with Sn. In order to achieve this effect, in the case of adding Sb, the Sb content is 0.010% or more. The Sb content is preferably 0.020% or more. If the Sb content is more than 0.100%, not only the effect is saturated but also productivity decreases and costs increase. The Sb content is therefore 0.100% or less. The Sb content is preferably 0.080% or less.

The chemical composition of the inner layer may optionally further contain P: 0.100% or less.

P: 0.100% or Less

Adding P can significantly improve the texture, thus improving magnetic flux density and reducing hysteresis loss, as with Sn, Sb, and Co. In order to achieve this effect, in the case of adding P, the P content is preferably 0.010% or more. The P content is more preferably 0.030% or more. If the P content is more than 0.100%, not only the effect is saturated but also productivity decreases and costs increase. The P content is therefore preferably 0.100% or less. The P content is more preferably 0.070% or less.

The chemical composition of the inner layer may optionally contain one or more of the following elements.

One or Two Selected from Ge and Ga: 0.0100% or Less in Total

Ge and Ga have the effect of improving the texture. In order to achieve this effect, in the case of adding one or both of Ge and Ga, the total content of one or two selected from Ge and Ga is preferably 0.0005% or more. The total content is more preferably 0.0020% or more. If the total content of one or two selected from Ge and Ga is more than 0.0100%, the effect is saturated and alloy costs merely increase. Therefore, in the case of adding one or both of Ge and Ga, the total content is 0.0100% or less. The total content is more preferably 0.0050% or less.

One or More Selected from Cu, Cr, and Ni: 1.00% or Less in Total

Cu, Cr, and Ni increase specific resistance and are advantageous in reducing iron loss. In order to achieve this effect, in the case of adding at least one of Cu, Cr, and Ni, the total content of one or more selected from Cu, Cr, and Ni is preferably 0.03% or more. If the total content of one or more selected from Cu, Cr, and Ni is excessively high, magnetic flux density decreases. Therefore, in the case of adding at least one of Cu, Cr, and Ni, the total content is 1.00% or less.

One or More Selected from Ca, Mg, and REM: 0.0200% or Less in Total

Ca, Mg, and REM have the effect of forming stable sulfides and improving grain growth. In order to achieve this effect, the total content of one or more selected from Ca, Mg, and REM is preferably 0.0010% or more. If the total content of one or more selected from Ca, Mg, and REM is more than 0.0200%, the effect is saturated. Therefore, in the case of adding at least one of Ca, Mg, and REM, the total content is 0.0200% or less.

Zn: 0.0500% or Less

Zn has the effect of suppressing nitridation during final annealing. In order to achieve this effect, in the case of adding Zn, the Zn content is preferably 0.0010% or more. The Zn content is more preferably 0.0020% or more. If the Zn content is more than 0.0500%, sulfides are formed and iron loss increases. Therefore, in the case of adding Zn, the Zn content is 0.0500% or less. The Zn content is more preferably 0.0100% or less.

One or Two Selected from Mo and W: 0.0500% or Less in Total

Both Mo and W are elements effective in suppressing surface defects (scab) in non-oriented electrical steel sheets. The non-oriented electrical steel sheet according to the present disclosure is high-alloy steel and its surface is susceptible to oxidation, so that scab caused by surface cracking is highly likely to occur. Adding a small amount of one or both of Mo and W, which are elements that enhance high-temperature strength, can suppress such cracking. This effect cannot be achieved sufficiently if the total content of one or two selected from Mo and W is less than 0.0010%. Therefore, in the case of adding one or both of Mo and W, the total content is preferably 0.0010% or more. If the total content of one or two selected from Mo and W is more than 0.0500%, the effect is saturated and alloy costs merely increase. Therefore, in the case of adding one or both of Mo and W, the total content is 0.0500% or less.

[Production Method]

A method of producing the electrical steel sheet according to the present disclosure is not limited, and any production method may be used. An example of the production method is cladding of steel materials that differ in Si content. The chemical compositions of the steel materials can be adjusted, for example, by blowing materials with different compositions in a converter and degassing the molten steels.

The cladding method is not limited. For example, a steel slab (steel material) for the surface layer having the above-described chemical composition and a steel slab (steel material) for the inner layer having the above-described chemical composition are prepared. The steel slab for the surface layer is then bonded or joined to both sides of the steel slab for the inner layer, with such a thickness that enables the final multilayer ratio to be the desired value. The bonded or joined steel slabs are then subjected to rolling. The rolling may be, for example, one or more selected from the group consisting of hot rolling, warm rolling, and cold rolling. Typically, a combination of hot rolling and subsequent warm rolling or a combination of hot rolling and subsequent cold rolling is preferably used. After the hot rolling, it is preferable to perform hot-rolled sheet annealing. The warm rolling may be performed two or more times with intermediate annealing therebetween. The cold rolling may be performed two or more times with intermediate annealing therebetween. The finish temperature and the coiling temperature in the hot rolling are not limited, and may be determined according to a conventional method. After the rolling, final annealing is performed.

As another production method, siliconizing treatment may be used. In the case of using siliconizing treatment, a steel sheet having a constant Si content in the thickness direction is subjected to siliconizing treatment, as a result of which the Si content in the surface layers on both sides of the steel sheet can be increased. The method of siliconizing treatment is not limited, and any method may be used. For example, a method may be used that involves depositing Si on the surface of a steel sheet by a chemical vapor deposition (CVD) method and then performing heat treatment to diffuse Si to the inside of the steel sheet. The Si content in each of the surface layer and the inner layer can be controlled by adjusting the amount of Si deposited by the CVD method and the heat treatment conditions.

Examples

In order to determine the effects according to the present disclosure, multilayer electrical steel sheets were produced according to the following procedure and their magnetic properties were evaluated.

For each of No. 3 to No. 27, No. 32, No. 33, and No. 36 to No. 76 shown in Tables 1 to 3, first, two types of steel slabs were prepared: one for the surface layer having the chemical composition shown in Table 1 and one for the inner layer having the chemical composition shown in Table 2. Next, the steel slab for the surface layer was stacked on both sides of the steel slab for the inner layer, and the stacked steel slabs were welded on their periphery. Hence, the chemical compositions of the surface layers on both sides of the inner layer were the same. The chemical compositions of the steel slabs were adjusted by performing blowing in a converter and then performing degassing. The chemical compositions were maintained in the finally obtained multilayer electrical steel sheet.

After this, the stacked steel slabs were heated at 1120° C. for 1 hour, and then hot rolled to a thickness of 2.0 mm to obtain a hot-rolled steel sheet. The hot-rolling finish temperature in the hot rolling was 800° C. The hot-rolled steel sheet was coiled at a coiling temperature of 610° C., and then subjected to hot-rolled sheet annealing at 940° C. for 30 seconds. Subsequently, the hot-rolled steel sheet was pickled and cold rolled, and further annealed at the final annealing temperature shown in Table 3 to obtain an electrical steel sheet. The sheet thickness t of the finally obtained electrical steel sheet and the ratio (multilayer ratio) of the thickness $t_1$ of the surface layers to t are shown in Table 3.

For comparison, the same test was conducted using ordinary electrical steel sheets that were not clad (i.e. non-clad electrical steel sheets) (No. 1 and No. 2). The electrical steel sheets of these Comparative Examples did not have a layered structure in which the composition differs in the thickness direction. In other words, these electrical steel sheets had no surface layer.

Multilayer electrical steel sheets of No. 28, No. 29, No. 30, No. 31, No. 34, and No. 35 were each produced by a siliconizing method. Specifically, a cold-rolled steel sheet with a Si content of 3.7% and a sheet thickness of 0.1 mm was subjected to siliconizing and diffusion treatment at 1200° C. The average value of the Si content in the entire sheet thickness of the steel sheet was calculated, and a part having a Si concentration higher than the average value was taken to be the surface layer and a part having a Si concentration lower than the average value was taken to be the inner layer. The Si content in the surface layer is the average value of the Si content in the surface layer.

TABLE 1

| | Surface layer | | | | | | | | | |
|---|---|---|---|---|---|---|---|---|---|---|
| No. | $[Si]_1$ (%) | C (%) | Co (%) | Sn (%) | Sb (%) | P (%) | Ga (%) | Ge (%) | Cu (%) | Cr (%) |
| 1 | 3.0 (non-clad) | 0.0025 | 0.0026 | 0.030 | — | — | — | — | — | — |
| 2 | 5.0 (non-clad) | 0.0021 | 0.0019 | 0.020 | — | — | — | — | — | — |
| 3 | 6.4 | 0.0035 | 0.0015 | 0.040 | — | — | — | — | — | — |
| 4 | 5.5 | 0.0035 | 0.0015 | 0.040 | — | — | — | — | — | — |
| 5 | 4.9 | 0.0035 | 0.0015 | 0.040 | — | — | — | — | — | — |
| 6 | 6.0 | 0.0035 | 0.0015 | 0.040 | — | — | — | — | — | — |
| 7 | 6.0 | 0.0035 | 0.0015 | 0.040 | — | — | — | — | — | — |
| 8 | 5.9 | 0.0056 | 0.0059 | — | 0.020 | — | — | — | — | — |
| 9 | 5.0 | 0.0056 | 0.0059 | — | — | — | — | — | — | — |
| 10 | 5.0 | 0.0056 | 0.0006 | 0.020 | — | — | — | — | — | — |
| 11 | 5.6 | 0.0092 | 0.0094 | 0.040 | — | — | — | — | — | — |
| 12 | 6.7 | 0.0092 | 0.0094 | 0.040 | — | — | — | — | — | — |
| 13 | 6.3 | 0.0028 | 0.0024 | 0.080 | — | 0.040 | — | — | — | — |
| 14 | 6.3 | 0.0028 | 0.0024 | 0.080 | — | 0.080 | — | — | — | — |
| 15 | 6.3 | 0.0035 | 0.0015 | 0.040 | 0.040 | — | — | — | — | — |
| 16 | 6.0 | 0.0150 | 0.0015 | 0.040 | 0.040 | — | — | — | — | — |
| 17 | 6.6 | 0.0007 | 0.0015 | 0.040 | 0.040 | — | — | — | — | — |

TABLE 1-continued

| | | | | | | | | | | | |
|---|---|---|---|---|---|---|---|---|---|---|---|
| 18 | 6.5 | 0.0032 | 0.0024 | 0.030 | — | — | — | — | — | — |
| 19 | 6.5 | 0.0032 | 0.0024 | 0.030 | — | — | — | — | — | — |
| 20 | 6.5 | 0.0032 | 0.0024 | 0.030 | — | — | — | — | — | — |
| 21 | 6.5 | 0.0032 | 0.0024 | 0.030 | — | — | — | — | — | — |
| 22 | 6.5 | 0.0032 | 0.0024 | 0.030 | — | — | — | — | — | — |
| 23 | 4.8 | 0.0032 | 0.0130 | 0.030 | — | — | — | — | — | — |
| 24 | 4.5 | 0.0031 | 0.0014 | 0.050 | 0.010 | — | — | — | — | — |
| 25 | 5.0 | 0.0031 | 0.0014 | 0.050 | 0.010 | — | — | — | — | — |
| 26 | 5.6 | 0.0039 | 0.0028 | 0.030 | — | 0.010 | — | — | — | — |
| 27 | 6.5 | 0.0025 | 0.0025 | 0.060 | — | — | — | — | — | — |
| 28 | 6.5 | 0.0035 | 0.0019 | 0.030 | — | — | — | — | — | — |
| 29 | 6.0 | 0.0038 | 0.0031 | 0.040 | — | — | — | — | — | — |
| 30 | 5.6 | 0.0041 | 0.0043 | 0.050 | — | — | — | — | — | — |
| 31 | 6.4 | 0.0044 | 0.0055 | 0.060 | — | — | — | — | — | — |
| 32 | 6.4 | 0.0035 | 0.0005 | — | — | — | — | — | — | — |
| 33 | 3.5 | 0.0039 | 0.0028 | 0.030 | — | 0.010 | — | — | — | — |
| 34 | 6.0 | 0.0038 | 0.0011 | 0.050 | — | — | — | — | — | — |
| 35 | 6.0 | 0.0038 | 0.0012 | — | 0.040 | — | — | — | — | — |
| 36 | 6.3 | 0.0028 | 0.0015 | — | — | — | — | — | — | — |
| 37 | 5.6 | 0.0039 | 0.0028 | 0.010 | — | 0.010 | — | — | — | — |
| 38 | 5.6 | 0.0039 | 0.0028 | — | 0.010 | 0.010 | — | — | — | — |
| 39 | 5.6 | 0.0039 | 0.0028 | 0.010 | 0.010 | 0.010 | — | — | — | — |
| 40 | 6.5 | 0.0032 | 0.0024 | 0.030 | — | — | — | — | — | — |
| 41 | 6.5 | 0.0032 | 0.0024 | 0.030 | — | — | — | — | — | — |
| 42 | 6.5 | 0.0035 | 0.0019 | 0.030 | — | — | 0.0008 | — | — | — |
| 43 | 6.5 | 0.0035 | 0.0019 | 0.030 | — | — | 0.0045 | — | — | — |
| 44 | 6.5 | 0.0035 | 0.0019 | 0.030 | — | — | — | 0.0007 | — | — |
| 45 | 6.5 | 0.0035 | 0.0019 | 0.030 | — | — | — | 0.0048 | — | — |
| 46 | 6.5 | 0.0035 | 0.0019 | 0.030 | — | — | 0.0012 | 0.0008 | — | — |
| 47 | 6.3 | 0.0028 | 0.0015 | — | — | — | — | — | 0.05 | — |
| 48 | 6.3 | 0.0028 | 0.0015 | — | — | — | — | — | 0.30 | — |
| 49 | 6.3 | 0.0028 | 0.0015 | — | — | — | — | — | 0.50 | — |
| 50 | 6.3 | 0.0028 | 0.0015 | — | — | — | — | — | — | 0.10 |
| 51 | 6.3 | 0.0028 | 0.0015 | — | — | — | — | — | — | 0.30 |
| 52 | 6.3 | 0.0028 | 0.0015 | — | — | — | — | — | — | 0.90 |
| 53 | 6.3 | 0.0028 | 0.0015 | — | — | — | — | — | — | — |
| 54 | 6.3 | 0.0028 | 0.0015 | — | — | — | — | — | — | — |
| 55 | 6.3 | 0.0028 | 0.0015 | — | — | — | — | — | — | — |
| 56 | 6.3 | 0.0028 | 0.0015 | — | — | — | — | — | 0.30 | 0.10 |
| 57 | 6.0 | 0.0038 | 0.0012 | — | 0.040 | — | — | — | — | — |
| 58 | 6.0 | 0.0038 | 0.0012 | — | 0.040 | — | — | — | — | — |
| 59 | 6.0 | 0.0038 | 0.0012 | — | 0.040 | — | — | — | — | — |
| 60 | 6.0 | 0.0038 | 0.0012 | — | 0.040 | — | — | — | — | — |
| 61 | 6.0 | 0.0038 | 0.0012 | — | 0.040 | — | — | — | — | — |
| 62 | 6.0 | 0.0038 | 0.0012 | — | 0.040 | — | — | — | — | — |
| 63 | 6.0 | 0.0038 | 0.0012 | — | 0.040 | — | — | — | — | — |
| 64 | 6.0 | 0.0038 | 0.0012 | — | 0.040 | — | — | — | — | — |
| 65 | 6.0 | 0.0038 | 0.0012 | — | 0.040 | — | — | — | — | — |
| 66 | 6.0 | 0.0038 | 0.0012 | — | 0.040 | — | — | — | — | — |
| 67 | 5.6 | 0.0039 | 0.0028 | 0.010 | — | 0.010 | — | — | — | — |
| 68 | 5.6 | 0.0039 | 0.0028 | 0.010 | — | 0.010 | — | — | — | — |
| 69 | 5.6 | 0.0039 | 0.0028 | 0.010 | — | 0.010 | — | — | — | — |
| 70 | 5.6 | 0.0039 | 0.0028 | 0.010 | — | 0.010 | — | — | — | — |
| 71 | 5.6 | 0.0039 | 0.0028 | 0.010 | — | 0.010 | — | — | — | — |
| 72 | 5.6 | 0.0039 | 0.0028 | 0.010 | — | 0.010 | — | — | — | — |
| 73 | 5.6 | 0.0039 | 0.0028 | 0.010 | — | 0.010 | — | — | — | — |
| 74 | 5.6 | 0.0039 | 0.0028 | 0.010 | — | 0.010 | — | — | — | — |
| 75 | 5.6 | 0.0039 | 0.0028 | 0.010 | — | 0.010 | — | — | — | — |
| 76 | 5.6 | 0.0039 | 0.0028 | 0.010 | — | 0.010 | — | — | — | — |

| | Surface layer | | | | | | |
|---|---|---|---|---|---|---|---|
| No. | Ni (%) | Zn (%) | Mo (%) | W (%) | Ca (%) | Mg (%) | REM (%) |
| 1 | — | — | — | — | — | — | — |
| 2 | — | — | — | — | — | — | — |
| 3 | — | — | — | — | — | — | — |
| 4 | — | — | — | — | — | — | — |
| 5 | — | — | — | — | — | — | — |
| 6 | — | — | — | — | — | — | — |
| 7 | — | — | — | — | — | — | — |
| 8 | — | — | — | — | — | — | — |
| 9 | — | — | — | — | — | — | — |
| 10 | — | — | — | — | — | — | — |
| 11 | — | — | — | — | — | — | — |
| 12 | — | — | — | — | — | — | — |
| 13 | — | — | — | — | — | — | — |
| 14 | — | — | — | — | — | — | — |
| 15 | — | — | — | — | — | — | — |
| 16 | — | — | — | — | — | — | — |

TABLE 1-continued

| | | | | | | | |
|---|---|---|---|---|---|---|---|
| 17 | — | — | — | — | — | — | — |
| 18 | — | — | — | — | — | — | — |
| 19 | — | — | — | — | — | — | — |
| 20 | — | — | — | — | — | — | — |
| 21 | — | — | — | — | — | — | — |
| 22 | — | — | — | — | — | — | — |
| 23 | — | — | — | — | — | — | — |
| 24 | — | — | — | — | — | — | — |
| 25 | — | — | — | — | — | — | — |
| 26 | — | — | — | — | — | — | — |
| 27 | — | — | — | — | — | — | — |
| 28 | — | — | — | — | — | — | — |
| 29 | — | — | — | — | — | — | — |
| 30 | — | — | — | — | — | — | — |
| 31 | — | — | — | — | — | — | — |
| 32 | — | — | — | — | — | — | — |
| 33 | — | — | — | — | — | — | — |
| 34 | — | — | — | — | — | — | — |
| 35 | — | — | — | — | — | — | — |
| 36 | — | — | — | — | — | — | — |
| 37 | — | — | — | — | — | — | — |
| 38 | — | — | — | — | — | — | — |
| 39 | — | — | — | — | — | — | — |
| 40 | — | — | — | — | — | — | — |
| 41 | — | — | — | — | — | — | — |
| 42 | — | — | — | — | — | — | — |
| 43 | — | — | — | — | — | — | — |
| 44 | — | — | — | — | — | — | — |
| 45 | — | — | — | — | — | — | — |
| 46 | — | — | — | — | — | — | — |
| 47 | — | — | — | — | — | — | — |
| 48 | — | — | — | — | — | — | — |
| 49 | — | — | — | — | — | — | — |
| 50 | — | — | — | — | — | — | — |
| 51 | — | — | — | — | — | — | — |
| 52 | — | — | — | — | — | — | — |
| 53 | 0.04 | — | — | — | — | — | — |
| 54 | 0.50 | — | — | — | — | — | — |
| 55 | 0.80 | — | — | — | — | — | — |
| 56 | 0.10 | — | — | — | — | — | — |
| 57 | — | 0.0015 | — | — | — | — | — |
| 58 | — | 0.0045 | — | — | — | — | — |
| 59 | — | 0.0210 | — | — | — | — | — |
| 60 | — | — | 0.0029 | — | — | — | — |
| 61 | — | — | 0.0300 | — | — | — | — |
| 62 | — | 0.0068 | 0.0050 | — | — | — | — |
| 63 | — | — | — | 0.0011 | — | — | — |
| 64 | — | — | — | 0.0140 | — | — | — |
| 65 | — | — | — | 0.0360 | — | — | — |
| 66 | — | — | — | — | 0.0024 | — | — |
| 67 | — | — | — | — | 0.0940 | — | — |
| 68 | — | — | — | — | 0.0180 | — | — |
| 69 | — | — | — | — | — | 0.0008 | — |
| 70 | — | — | — | — | — | 0.0025 | — |
| 71 | — | — | — | — | — | 0.0086 | — |
| 72 | — | — | — | — | — | — | 0.0007 |
| 73 | — | — | — | — | — | — | 0.0034 |
| 74 | — | — | — | — | — | — | 0.0091 |
| 75 | — | — | — | — | 0.0019 | — | 0.0008 |
| 76 | — | — | — | — | 0.0026 | 0.0014 | — |

| | Inner layer | | | | | | | | | |
|---|---|---|---|---|---|---|---|---|---|---|
| No. | $[Si]_0$ (%) | C (%) | Co (%) | Sn (%) | Sb (%) | P (%) | Ga (%) | Ge (%) | Cu (%) | Cr (%) |
| 1 | 3.0 (non-clad) | 0.0025 | 0.0026 | 0.030 | — | — | — | — | — | — |
| 2 | 5.0 (non-clad) | 0.0021 | 0.0019 | 0.020 | — | — | — | — | — | — |
| 3 | 6.0 | 0.0035 | 0.0015 | 0.040 | — | — | — | — | — | — |
| 4 | 5.2 | 0.0035 | 0.0015 | 0.040 | — | — | — | — | — | — |
| 5 | 4.4 | 0.0035 | 0.0015 | 0.040 | — | — | — | — | — | — |
| 6 | 5.0 | 0.0035 | 0.0015 | 0.040 | — | — | — | — | — | — |
| 7 | 3.5 | 0.0035 | 0.0015 | 0.040 | — | — | — | — | — | — |
| 8 | 5.5 | 0.0056 | 0.0059 | — | 0.020 | — | — | — | — | — |
| 9 | 4.5 | 0.0056 | 0.0059 | — | — | — | — | — | — | — |

-continued

| | | | | | | | | | | | |
|---|---|---|---|---|---|---|---|---|---|---|---|
| 10 | 4.5 | 0.0056 | 0.0006 | 0.020 | — | — | — | — | — | — |
| 11 | 5.3 | 0.0092 | 0.0094 | 0.040 | — | — | — | — | — | — |
| 12 | 6.4 | 0.0092 | 0.0094 | 0.040 | — | — | — | — | — | — |
| 13 | 6.0 | 0.0028 | 0.0024 | 0.080 | — | 0.040 | — | — | — | — |
| 14 | 6.0 | 0.0028 | 0.0024 | 0.080 | — | 0.080 | — | — | — | — |
| 15 | 6.0 | 0.0035 | 0.0015 | 0.040 | 0.040 | — | — | — | — | — |
| 16 | 5.7 | 0.0150 | 0.0015 | 0.040 | 0.040 | — | — | — | — | — |
| 17 | 6.4 | 0.0007 | 0.0015 | 0.040 | 0.040 | — | — | — | — | — |
| 18 | 6.2 | 0.0032 | 0.0024 | 0.030 | — | — | — | — | — | — |
| 19 | 6.2 | 0.0032 | 0.0024 | 0.030 | — | — | — | — | — | — |
| 20 | 6.2 | 0.0032 | 0.0024 | 0.030 | — | — | — | — | — | — |
| 21 | 6.2 | 0.0032 | 0.0024 | 0.030 | — | — | — | — | — | — |
| 22 | 6.2 | 0.0032 | 0.0024 | 0.030 | — | — | — | — | — | — |
| 23 | 4.3 | 0.0032 | 0.0130 | 0.030 | — | — | — | — | — | — |
| 24 | 4.0 | 0.0031 | 0.0014 | 0.050 | 0.010 | — | — | — | — | — |
| 25 | 4.8 | 0.0031 | 0.0014 | 0.050 | 0.010 | — | — | — | — | — |
| 26 | 5.2 | 0.0039 | 0.0028 | 0.030 | — | 0.010 | — | — | — | — |
| 27 | 6.4 | 0.0025 | 0.0025 | 0.060 | — | — | — | — | — | — |
| 28 | 6.1 | 0.0035 | 0.0019 | 0.030 | — | — | — | — | — | — |
| 29 | 5.7 | 0.0038 | 0.0031 | 0.040 | — | — | — | — | — | — |
| 30 | 5.3 | 0.0041 | 0.0043 | 0.050 | — | — | — | — | — | — |
| 31 | 6.2 | 0.0044 | 0.0055 | 0.060 | — | — | — | — | — | — |
| 32 | 6.0 | 0.0035 | 0.0005 | — | — | — | — | — | — | — |
| 33 | 3.0 | 0.0039 | 0.0028 | 0.030 | — | 0.010 | — | — | — | — |
| 34 | 5.7 | 0.0038 | 0.0011 | 0.050 | — | — | — | — | — | — |
| 35 | 5.7 | 0.0038 | 0.0012 | — | 0.040 | — | — | — | — | — |
| 36 | 6.0 | 0.0028 | 0.0015 | — | — | — | — | — | — | — |
| 37 | 5.2 | 0.0039 | 0.0028 | 0.010 | — | 0.010 | — | — | — | — |
| 38 | 5.2 | 0.0039 | 0.0028 | — | 0.010 | 0.010 | — | — | — | — |
| 39 | 5.2 | 0.0039 | 0.0028 | 0.010 | 0.010 | 0.010 | — | — | — | — |
| 40 | 6.2 | 0.0032 | 0.0024 | 0.030 | — | — | — | — | — | — |
| 41 | 6.2 | 0.0032 | 0.0024 | 0.030 | — | — | — | — | — | — |
| 42 | 6.1 | 0.0035 | 0.0019 | 0.030 | — | — | 0.0008 | — | — | — |
| 43 | 6.1 | 0.0035 | 0.0019 | 0.030 | — | — | 0.0045 | — | — | — |
| 44 | 6.1 | 0.0035 | 0.0019 | 0.030 | — | — | — | 0.0007 | — | — |
| 45 | 6.1 | 0.0035 | 0.0019 | 0.030 | — | — | — | 0.0048 | — | — |
| 46 | 6.1 | 0.0035 | 0.0019 | 0.030 | — | — | 0.0012 | 0.0008 | — | — |
| 47 | 6.0 | 0.0028 | 0.0015 | — | — | — | — | — | 0.05 | — |
| 48 | 6.0 | 0.0028 | 0.0015 | — | — | — | — | — | 0.30 | — |
| 49 | 6.0 | 0.0028 | 0.0015 | — | — | — | — | — | 0.50 | — |
| 50 | 6.0 | 0.0028 | 0.0015 | — | — | — | — | — | — | 0.10 |
| 51 | 6.0 | 0.0028 | 0.0015 | — | — | — | — | — | — | 0.30 |
| 52 | 6.0 | 0.0028 | 0.0015 | — | — | — | — | — | — | 0.90 |
| 53 | 6.0 | 0.0028 | 0.0015 | — | — | — | — | — | — | — |
| 54 | 6.0 | 0.0028 | 0.0015 | — | — | — | — | — | — | — |
| 55 | 6.0 | 0.0028 | 0.0015 | — | — | — | — | — | — | — |
| 56 | 6.0 | 0.0028 | 0.0015 | — | — | — | — | — | 0.30 | 0.10 |
| 57 | 5.7 | 0.0038 | 0.0012 | — | 0.040 | — | — | — | — | — |
| 58 | 5.7 | 0.0038 | 0.0012 | — | 0.040 | — | — | — | — | — |
| 59 | 5.7 | 0.0038 | 0.0012 | — | 0.040 | — | — | — | — | — |
| 60 | 5.7 | 0.0038 | 0.0012 | — | 0.040 | — | — | — | — | — |
| 61 | 5.7 | 0.0038 | 0.0012 | — | 0.040 | — | — | — | — | — |
| 62 | 5.7 | 0.0038 | 0.0012 | — | 0.040 | — | — | — | — | — |
| 63 | 5.7 | 0.0038 | 0.0012 | — | 0.040 | — | — | — | — | — |
| 64 | 5.7 | 0.0038 | 0.0012 | — | 0.040 | — | — | — | — | — |
| 65 | 5.7 | 0.0038 | 0.0012 | — | 0.040 | — | — | — | — | — |
| 66 | 5.7 | 0.0038 | 0.0012 | — | 0.040 | — | — | — | — | — |
| 67 | 5.2 | 0.0039 | 0.0028 | 0.010 | — | 0.010 | — | — | — | — |
| 68 | 5.2 | 0.0039 | 0.0028 | 0.010 | — | 0.010 | — | — | — | — |
| 69 | 5.2 | 0.0039 | 0.0028 | 0.010 | — | 0.010 | — | — | — | — |
| 70 | 5.2 | 0.0039 | 0.0028 | 0.010 | — | 0.010 | — | — | — | — |
| 71 | 5.2 | 0.0039 | 0.0028 | 0.010 | — | 0.010 | — | — | — | — |
| 72 | 5.2 | 0.0039 | 0.0028 | 0.010 | — | 0.010 | — | — | — | — |
| 73 | 5.2 | 0.0039 | 0.0028 | 0.010 | — | 0.010 | — | — | — | — |
| 74 | 5.2 | 0.0039 | 0.0028 | 0.010 | — | 0.010 | — | — | — | — |
| 75 | 5.2 | 0.0039 | 0.0028 | 0.010 | — | 0.010 | — | — | — | — |
| 76 | 5.2 | 0.0039 | 0.0028 | 0.010 | — | 0.010 | — | — | — | — |

| | Inner layer | | | | | | |
|---|---|---|---|---|---|---|---|
| No. | Ni (%) | Zn (%) | Mo (%) | W (%) | Ca (%) | Mg (%) | REM (%) |
| 1 | — | — | — | — | — | — | — |
| 2 | — | — | — | — | — | — | — |
| 3 | — | — | — | — | — | — | — |
| 4 | — | — | — | — | — | — | — |
| 5 | — | — | — | — | — | — | — |
| 6 | — | — | — | — | — | — | — |
| 7 | — | — | — | — | — | — | — |

-continued

| | | | | | | | |
|---|---|---|---|---|---|---|---|
| 8 | — | — | — | — | — | — | — |
| 9 | — | — | — | — | — | — | — |
| 10 | — | — | — | — | — | — | — |
| 11 | — | — | — | — | — | — | — |
| 12 | — | — | — | — | — | — | — |
| 13 | — | — | — | — | — | — | — |
| 14 | — | — | — | — | — | — | — |
| 15 | — | — | — | — | — | — | — |
| 16 | — | — | — | — | — | — | — |
| 17 | — | — | — | — | — | — | — |
| 18 | — | — | — | — | — | — | — |
| 19 | — | — | — | — | — | — | — |
| 20 | — | — | — | — | — | — | — |
| 21 | — | — | — | — | — | — | — |
| 22 | — | — | — | — | — | — | — |
| 23 | — | — | — | — | — | — | — |
| 24 | — | — | — | — | — | — | — |
| 25 | — | — | — | — | — | — | — |
| 26 | — | — | — | — | — | — | — |
| 27 | — | — | — | — | — | — | — |
| 28 | — | — | — | — | — | — | — |
| 29 | — | — | — | — | — | — | — |
| 30 | — | — | — | — | — | — | — |
| 31 | — | — | — | — | — | — | — |
| 32 | — | — | — | — | — | — | — |
| 33 | — | — | — | — | — | — | — |
| 34 | — | — | — | — | — | — | — |
| 35 | — | — | — | — | — | — | — |
| 36 | — | — | — | — | — | — | — |
| 37 | — | — | — | — | — | — | — |
| 38 | — | — | — | — | — | — | — |
| 39 | — | — | — | — | — | — | — |
| 40 | — | — | — | — | — | — | — |
| 41 | — | — | — | — | — | — | — |
| 42 | — | — | — | — | — | — | — |
| 43 | — | — | — | — | — | — | — |
| 44 | — | — | — | — | — | — | — |
| 45 | — | — | — | — | — | — | — |
| 46 | — | — | — | — | — | — | — |
| 47 | — | — | — | — | — | — | — |
| 48 | — | — | — | — | — | — | — |
| 49 | — | — | — | — | — | — | — |
| 50 | — | — | — | — | — | — | — |
| 51 | — | — | — | — | — | — | — |
| 52 | — | — | — | — | — | — | — |
| 53 | 0.04 | — | — | — | — | — | — |
| 54 | 0.50 | — | — | — | — | — | — |
| 55 | 0.80 | — | — | — | — | — | — |
| 56 | 0.10 | — | — | — | — | — | — |
| 57 | — | 0.0015 | — | — | — | — | — |
| 58 | — | 0.0045 | — | — | — | — | — |
| 59 | — | 0.0210 | — | — | — | — | — |
| 60 | — | — | 0.0029 | — | — | — | — |
| 61 | — | — | 0.0300 | — | — | — | — |
| 62 | — | 0.0068 | 0.0050 | — | — | — | — |
| 63 | — | — | — | 0.0011 | — | — | — |
| 64 | — | — | — | 0.0140 | — | — | — |
| 65 | — | — | — | 0.0360 | — | — | — |
| 66 | — | — | — | — | 0.0024 | — | — |
| 67 | — | — | — | — | 0.0940 | — | — |
| 68 | — | — | — | — | 0.0180 | — | — |
| 69 | — | — | — | — | — | 0.0008 | — |
| 70 | — | — | — | — | — | 0.0025 | — |
| 71 | — | — | — | — | — | 0.0086 | — |
| 72 | — | — | — | — | — | — | 0.0007 |
| 73 | — | — | — | — | — | — | 0.0034 |
| 74 | — | — | — | — | — | — | 0.0091 |
| 75 | — | — | — | — | 0.0019 | — | 0.0008 |
| 76 | — | — | — | — | 0.0026 | 0.0014 | — |

TABLE 3

| No. | Entire sheet thickness t (mm) | ΔSi (%) | Multilayer ratio (Total surface layer thickness $t_1$/entire sheet thickness t) | Final annealing temperature (° C.) | Remarks |
|---|---|---|---|---|---|
| 1 | 0.10 | 0.0 | — | 1000 | Comparative Example |
| 2 | 0.20 | 0.0 | — | 1000 | Comparative Example |
| 3 | 0.10 | 0.4 | 0.35 | 1050 | Example |
| 4 | 0.10 | 0.3 | 0.35 | 1050 | Example |
| 5 | 0.10 | 0.5 | 0.35 | 1050 | Example |
| 6 | 0.10 | 1.0 | 0.35 | 1050 | Comparative Example |
| 7 | 0.10 | 2.5 | 0.35 | 1050 | Comparative Example |
| 8 | 0.08 | 0.4 | 0.50 | 1100 | Example |
| 9 | 0.08 | 0.5 | 0.50 | 1100 | Comparative Example |
| 10 | 0.08 | 0.5 | 0.50 | 1100 | Comparative Example |
| 11 | 0.07 | 0.3 | 0.50 | 1000 | Example |
| 12 | 0.05 | 0.3 | 0.40 | 1000 | Example |
| 13 | 0.10 | 0.3 | 0.30 | 1050 | Example |
| 14 | 0.10 | 0.3 | 0.30 | 1050 | Example |
| 15 | 0.10 | 0.3 | 0.35 | 1050 | Example |
| 16 | 0.10 | 0.3 | 0.35 | 1050 | Comparative Example |
| 17 | 0.10 | 0.2 | 0.35 | 1050 | Comparative Example |
| 18 | 0.15 | 0.3 | 0.03 | 1000 | Comparative Example |
| 19 | 0.15 | 0.3 | 0.15 | 1000 | Example |
| 20 | 0.15 | 0.3 | 0.40 | 1000 | Example |
| 21 | 0.15 | 0.3 | 0.65 | 1000 | Example |
| 22 | 0.15 | 0.3 | 0.80 | 1000 | Comparative Example |
| 23 | 0.15 | 0.5 | 0.65 | 1000 | Comparative Example |
| 24 | 0.06 | 0.5 | 0.40 | 1050 | Example |
| 25 | 0.20 | 0.2 | 0.40 | 1050 | Example |
| 26 | 0.10 | 0.4 | 0.40 | 1050 | Example |
| 27 | 0.10 | 0.1 | 0.40 | 1100 | Example |
| 28 | 0.10 | 0.4 | 0.30 | 1200 | Example |
| 29 | 0.10 | 0.3 | 0.30 | 1200 | Example |
| 30 | 0.10 | 0.3 | 0.30 | 1200 | Example |
| 31 | 0.10 | 0.2 | 0.30 | 1200 | Example |
| 32 | 0.10 | 0.4 | 0.35 | 1050 | Comparative Example |
| 33 | 0.10 | 0.4 | 0.40 | 1050 | Comparative Example |
| 34 | 0.10 | 0.3 | 0.30 | 1200 | Example |
| 35 | 0.10 | 0.3 | 0.30 | 1200 | Example |
| 36 | 0.10 | 0.3 | 0.30 | 1050 | Example |
| 37 | 0.10 | 0.4 | 0.40 | 1050 | Example |

TABLE 3-continued

| No. | Entire sheet thickness t (mm) | ΔSi (%) | Multilayer ratio (Total surface layer thickness $t_1$/entire sheet thickness t) | Final annealing temperature (° C.) | Remarks |
|---|---|---|---|---|---|
| 38 | 0.10 | 0.4 | 0.40 | 1050 | Example |
| 39 | 0.10 | 0.4 | 0.40 | 1050 | Example |
| 40 | 0.15 | 0.3 | 0.05 | 1000 | Example |
| 41 | 0.15 | 0.3 | 0.75 | 1000 | Example |
| 42 | 0.10 | 0.4 | 0.30 | 1200 | Example |
| 43 | 0.10 | 0.4 | 0.30 | 1200 | Example |
| 44 | 0.10 | 0.4 | 0.30 | 1200 | Example |
| 45 | 0.10 | 0.4 | 0.30 | 1200 | Example |
| 46 | 0.10 | 0.4 | 0.30 | 1200 | Example |
| 47 | 0.10 | 0.3 | 0.30 | 1050 | Example |
| 48 | 0.10 | 0.3 | 0.30 | 1050 | Example |
| 49 | 0.10 | 0.3 | 0.30 | 1050 | Example |
| 50 | 0.10 | 0.3 | 0.30 | 1050 | Example |
| 51 | 0.10 | 0.3 | 0.30 | 1050 | Example |
| 52 | 0.10 | 0.3 | 0.30 | 1050 | Example |
| 53 | 0.10 | 0.3 | 0.30 | 1050 | Example |
| 54 | 0.10 | 0.3 | 0.30 | 1050 | Example |
| 55 | 0.10 | 0.3 | 0.30 | 1050 | Example |
| 56 | 0.10 | 0.3 | 0.30 | 1050 | Example |
| 57 | 0.10 | 0.3 | 0.30 | 1200 | Example |
| 58 | 0.10 | 0.3 | 0.30 | 1200 | Example |
| 59 | 0.10 | 0.3 | 0.30 | 1200 | Example |
| 60 | 0.10 | 0.3 | 0.30 | 1200 | Example |
| 61 | 0.10 | 0.3 | 0.30 | 1200 | Example |
| 62 | 0.10 | 0.3 | 0.30 | 1200 | Example |
| 63 | 0.10 | 0.3 | 0.30 | 1200 | Example |
| 64 | 0.10 | 0.3 | 0.30 | 1200 | Example |
| 65 | 0.10 | 0.3 | 0.30 | 1200 | Example |
| 66 | 0.10 | 0.3 | 0.30 | 1200 | Example |
| 67 | 0.10 | 0.4 | 0.40 | 1050 | Example |
| 68 | 0.10 | 0.4 | 0.40 | 1050 | Example |
| 69 | 0.10 | 0.4 | 0.40 | 1050 | Example |
| 70 | 0.10 | 0.4 | 0.40 | 1050 | Example |
| 71 | 0.10 | 0.4 | 0.40 | 1050 | Example |
| 72 | 0.10 | 0.4 | 0.40 | 1050 | Example |
| 73 | 0.10 | 0.4 | 0.40 | 1050 | Example |
| 74 | 0.10 | 0.4 | 0.40 | 1050 | Example |
| 75 | 0.10 | 0.4 | 0.40 | 1050 | Example |
| 76 | 0.10 | 0.4 | 0.40 | 1050 | Example |

(Magnetic Properties)

Next, the magnetic properties of each of the obtained electrical steel sheets were measured. The magnetic measurement was performed using a 25 cm Epstein frame in accordance with JIS C 2550-1. As the magnetic properties, iron loss $W_{10/800}$ (W/kg) at 1.0 T and 800 Hz, magnetic flux density $B_{50}$ at a magnetic field strength of 5000 A/m, and saturation magnetization Bs were measured. The measurement results are shown in Table 4.

TABLE 4

| No. | 13 + 80 × t | $W_{10/800}$ (W/kg) | $B_{50}$ (T) | Saturation magnetization Bs (T) | $B_{50}$/Bs | Maximum intensity of {100} plane | Remarks |
|---|---|---|---|---|---|---|---|
| 1 | 21 | 23.0 | 1.67 | 2.01 | 0.832 | 9.3 | Comparative Example |
| 2 | 29 | 32.0 | 1.56 | 1.88 | 0.830 | 8.6 | Comparative Example |
| 3 | 21 | 18.2 | 1.53 | 1.81 | 0.847 | 9.2 | Example |
| 4 | 21 | 18.9 | 1.59 | 1.86 | 0.855 | 8.8 | Example |
| 5 | 21 | 19.2 | 1.63 | 1.91 | 0.855 | 8.9 | Example |
| 6 | 21 | 22.6 | 1.55 | 1.86 | 0.834 | 7.3 | Comparative Example |
| 7 | 21 | 24.4 | 1.61 | 1.92 | 0.839 | 8.2 | Comparative Example |
| 8 | 19 | 17.2 | 1.55 | 1.84 | 0.845 | 9.1 | Example |
| 9 | 19 | 20.5 | 1.49 | 1.90 | 0.786 | 2.6 | Comparative Example |
| 10 | 19 | 20.9 | 1.50 | 1.90 | 0.791 | 3.1 | Comparative Example |
| 11 | 19 | 17.4 | 1.55 | 1.85 | 0.837 | 6.9 | Example |
| 12 | 17 | 15.9 | 1.49 | 1.78 | 0.836 | 6.5 | Example |
| 13 | 21 | 17.9 | 1.53 | 1.81 | 0.845 | 9.8 | Example |
| 14 | 21 | 17.5 | 1.54 | 1.81 | 0.851 | 10.5 | Example |

TABLE 4-continued

| No. | 13 + 80 × t | $W_{10/800}$ (W/kg) | $B_{50}$ (T) | Saturation magnetization Bs (T) | $B_{50}$/Bs | Maximum intensity of {100} plane | Remarks |
|---|---|---|---|---|---|---|---|
| 15 | 21 | 17.3 | 1.54 | 1.81 | 0.851 | 10.1 | Example |
| 16 | 21 | 23.7 | 1.52 | 1.83 | 0.831 | 9.8 | Comparative Example |
| 17 | 21 | — | — | — | — | — | Comparative Example (cracking of product sheet) |
| 18 | 25 | 28.2 | 1.52 | 1.80 | 0.844 | 9.4 | Comparative Example |
| 19 | 25 | 23.1 | 1.52 | 1.80 | 0.844 | 9.5 | Example |
| 20 | 25 | 22.5 | 1.52 | 1.80 | 0.847 | 9.5 | Example |
| 21 | 25 | 22.4 | 1.51 | 1.79 | 0.843 | 9.5 | Example |
| 22 | 25 | 26.9 | 1.51 | 1.79 | 0.844 | 9.4 | Comparative Example |
| 23 | 25 | 27.2 | 1.59 | 1.90 | 0.835 | 9.2 | Comparative Example |
| 24 | 18 | 16.9 | 1.64 | 1.93 | 0.849 | 8.4 | Example |
| 25 | 29 | 26.4 | 1.61 | 1.89 | 0.853 | 9.6 | Example |
| 26 | 21 | 19.3 | 1.57 | 1.86 | 0.845 | 9.9 | Example |
| 27 | 21 | 16.4 | 1.52 | 1.79 | 0.850 | 9.7 | Example |
| 28 | 21 | 16.4 | 1.53 | 1.80 | 0.849 | 9.1 | Example |
| 29 | 21 | 17.1 | 1.55 | 1.83 | 0.847 | 9.1 | Example |
| 30 | 21 | 17.2 | 1.56 | 1.86 | 0.841 | 9.1 | Example |
| 31 | 21 | 16.8 | 1.53 | 1.80 | 0.850 | 9.1 | Example |
| 32 | 21 | 23.1 | 1.45 | 1.81 | 0.802 | 2.1 | Comparative Example |
| 33 | 21 | 26.7 | 1.65 | 1.99 | 0.829 | 6.8 | Comparative Example |
| 34 | 21 | 17.5 | 1.54 | 1.83 | 0.842 | 7.3 | Example |
| 35 | 21 | 17.6 | 1.54 | 1.83 | 0.842 | 7.4 | Example |
| 36 | 21 | 18.9 | 1.50 | 1.81 | 0.829 | 5.2 | Example |
| 37 | 21 | 20.1 | 1.54 | 1.86 | 0.829 | 7.4 | Example |
| 38 | 21 | 20.1 | 1.54 | 1.86 | 0.829 | 7.4 | Example |
| 39 | 21 | 19.8 | 1.55 | 1.86 | 0.835 | 7.9 | Example |
| 40 | 25 | 24.7 | 1.52 | 1.80 | 0.844 | 9.4 | Example |
| 41 | 25 | 24.5 | 1.59 | 1.90 | 0.835 | 9.2 | Example |
| 42 | 21 | 16.2 | 1.54 | 1.80 | 0.855 | 9.2 | Example |
| 43 | 21 | 16.1 | 1.54 | 1.80 | 0.855 | 9.3 | Example |
| 44 | 21 | 16.0 | 1.54 | 1.80 | 0.855 | 9.4 | Example |
| 45 | 21 | 16.2 | 1.54 | 1.80 | 0.855 | 9.3 | Example |
| 46 | 21 | 16.1 | 1.55 | 1.80 | 0.860 | 9.5 | Example |
| 47 | 21 | 18.6 | 1.50 | 1.81 | 0.829 | 5.2 | Example |
| 48 | 21 | 18.4 | 1.50 | 1.81 | 0.829 | 5.2 | Example |
| 49 | 21 | 18.3 | 1.50 | 1.81 | 0.829 | 5.2 | Example |
| 50 | 21 | 18.3 | 1.50 | 1.81 | 0.829 | 5.2 | Example |
| 51 | 21 | 18.2 | 1.50 | 1.81 | 0.829 | 5.2 | Example |
| 52 | 21 | 18.2 | 1.50 | 1.81 | 0.829 | 5.2 | Example |
| 53 | 21 | 18.3 | 1.50 | 1.81 | 0.829 | 5.2 | Example |
| 54 | 21 | 18.1 | 1.50 | 1.81 | 0.829 | 5.2 | Example |
| 55 | 21 | 18.2 | 1.50 | 1.81 | 0.829 | 5.2 | Example |
| 56 | 21 | 18.2 | 1.50 | 1.81 | 0.829 | 5.2 | Example |
| 57 | 21 | 17.4 | 1.54 | 1.83 | 0.842 | 7.4 | Example |
| 58 | 21 | 17.3 | 1.54 | 1.83 | 0.842 | 7.4 | Example |
| 59 | 21 | 17.2 | 1.54 | 1.83 | 0.842 | 7.4 | Example |
| 60 | 21 | 17.3 | 1.54 | 1.83 | 0.842 | 7.4 | Example |
| 61 | 21 | 17.2 | 1.54 | 1.83 | 0.842 | 7.4 | Example |
| 62 | 21 | 17.3 | 1.54 | 1.83 | 0.842 | 7.4 | Example |
| 63 | 21 | 17.1 | 1.54 | 1.83 | 0.842 | 7.4 | Example |
| 64 | 21 | 17.4 | 1.54 | 1.83 | 0.842 | 7.4 | Example |
| 65 | 21 | 17.2 | 1.54 | 1.83 | 0.842 | 7.4 | Example |
| 66 | 21 | 17.3 | 1.54 | 1.83 | 0.842 | 7.4 | Example |
| 67 | 21 | 19.6 | 1.54 | 1.86 | 0.829 | 7.4 | Example |
| 68 | 21 | 19.3 | 1.54 | 1.86 | 0.829 | 7.4 | Example |
| 69 | 21 | 19.4 | 1.54 | 1.86 | 0.829 | 7.4 | Example |
| 70 | 21 | 19.3 | 1.54 | 1.86 | 0.829 | 7.4 | Example |
| 71 | 21 | 19.2 | 1.54 | 1.86 | 0.829 | 7.4 | Example |
| 72 | 21 | 19.4 | 1.54 | 1.86 | 0.829 | 7.4 | Example |
| 73 | 21 | 19.2 | 1.54 | 1.86 | 0.829 | 7.4 | Example |
| 74 | 21 | 19.3 | 1.54 | 1.86 | 0.829 | 7.4 | Example |
| 75 | 21 | 19.4 | 1.54 | 1.86 | 0.829 | 7.4 | Example |
| 76 | 21 | 19.2 | 1.54 | 1.86 | 0.829 | 7.4 | Example |

As can be seen from the results shown in Table 4, the electrical steel sheet of each Example satisfying the conditions according to the present disclosure had excellent properties such as low high-frequency iron loss and high magnetic flux density.

INDUSTRIAL APPLICABILITY

An electrical steel sheet according to the present disclosure is very suitable for use as a core material for motor cores of hybrid electric vehicles, electric vehicles, vacuum cleaners, high-speed generators, air conditioner compressors, machine tools, etc. that are driven at high frequencies, as well as transformers, reactors, etc.

The invention claimed is:

1. A non-oriented electrical steel sheet that is a multilayer electrical steel sheet having a stacked structure of an inner layer and a surface layer located on each of both sides of the inner layer, wherein the surface layer has a chemical composition containing, in mass %, Si: 4.0% to 7.0%, C: 0.0010% to 0.0100%, Co: 0.0010% to 0.0050%, and one or two selected from Sn: 0.010% to 0.100% and Sb: 0.010% to 0.100%, with a balance consisting of Fe and inevitable impurities, the inner layer has a chemical composition containing, in mass %, Si: 3.5% to 6.5%, C: 0.0010% to 0.0100%, Co: 0.0010% to 0.0050%, and one or two selected from Sn: 0.010% to 0.100% and Sb: 0.010% to 0.100%, with a balance consisting of Fe and inevitable impurities, ΔSi defined as a difference $[Si]_1-[Si]_0$ between a Si content $[Si]_1$ in the surface layer and a Si content $[Si]_0$ in the inner layer is 0.1 mass % to 0.5 mass %, the non-oriented electrical steel sheet has a sheet thickness t of 0.03 mm to 0.20 mm, a ratio $t_1/t$ of a total thickness t, in mm, of the surface layers on both sides of the inner layer to the sheet thickness t, in mm, of the electrical steel sheet is 0.04 to 0.78, a maximum intensity value of {100} plane integration degree is 6.0 or more in a $\Phi_2=45°$ section of an orientation distribution function at a plane of a depth of ¼ of the sheet thickness from a surface of the multilayer electrical steel sheet, and a ratio $B_{50}/Bs$ of magnetic flux density $B_{50}$ at a magnetic field strength of 5000 A/m to saturation magnetization Bs of the non-oriented electrical steel sheet is 0.825 or more, and iron loss of the non-oriented electrical steel sheet $W_{10/800}$, in W/kg, at a frequency of 800 Hz and a maximum magnetic flux density of 1.0 T and the sheet thickness t, in mm, satisfy the following formula (1):

$$W_{10/800} \leq 13 + 80 \times t. \quad (1)$$

2. The non-oriented electrical steel sheet according to claim 1, wherein one or both of the chemical composition of the surface layer and the chemical composition of the inner layer further contain, in mass %, at least one of the following:

a) P: 0.100% or less, b) one or two selected from Ge and Ga: 0.0100% or less in total, c) one or more selected from Cu, Cr, and Ni: 1.00% or less in total, d) one or more selected from Ca, Mg, and REM: 0.0200% or less in total, e) Zn: 0.0500% or less, and f) one or two selected from Mo and W: 0.0500% or less in total.

* * * * *